(12) United States Patent
Gall et al.

(10) Patent No.: US 7,926,760 B2
(45) Date of Patent: Apr. 19, 2011

(54) METHOD FOR PRODUCING AN AIRCRAFT WITH REDUCED ENVIRONMENTAL IMPACT AND THE AIRCRAFT THUS OBTAINED

(75) Inventors: Pierre-Emmanuel Gall, Toulouse (FR); Julien Ricouard, Toulouse (FR)

(73) Assignee: Airbus France, Toulouse (FR)

( * ) Notice: Subject to any disclaimer, the term of this patent is extended or adjusted under 35 U.S.C. 154(b) by 889 days.

(21) Appl. No.: 11/850,438

(22) Filed: Sep. 5, 2007

(65) Prior Publication Data
US 2010/0264264 A1  Oct. 21, 2010

(30) Foreign Application Priority Data

Sep. 5, 2006 (FR) .................................... 06 07751

(51) Int. Cl.
  *B64D 27/00* (2006.01)
(52) U.S. Cl. ................... 244/55; 244/1 N; 244/45 R
(58) Field of Classification Search ............... 244/1 N, 244/45 R, 55; D12/319, 344
See application file for complete search history.

(56) References Cited

U.S. PATENT DOCUMENTS

| | | | | |
|---|---|---|---|---|
| 3,735,946 A | * | 5/1973 | Mullins | 244/54 |
| 3,936,017 A | | 2/1976 | Blythe et al. | |
| 4,629,147 A | * | 12/1986 | Johnson et al. | 244/55 |
| 4,953,812 A | * | 9/1990 | Van der Hoeven | 244/55 |
| 4,976,396 A | * | 12/1990 | Carlson et al. | 244/55 |
| 5,135,185 A | * | 8/1992 | Adamson et al. | 244/55 |
| 5,145,129 A | * | 9/1992 | Gebhard | 244/12.5 |
| D530,658 S | * | 10/2006 | Vigneron et al. | D12/319 |
| 2006/0011779 A1 | * | 1/2006 | Cazals et al. | 244/54 |

FOREIGN PATENT DOCUMENTS

| | | |
|---|---|---|
| FR | 2873096 | 1/2006 |
| GB | 1397068 | 6/1795 |
| GB | 1463810 | 2/1977 |
| GB | 2203710 | 10/1988 |
| WO | 2006114493 | 11/2006 |

OTHER PUBLICATIONS

Steinke S.; "Aus Der Trickkiste Der Flugzeugentwickler Airbus-Konzepte Fuer Uebermorgen," Flug Revue, Stuttgart, DE, vol. 1/2001, Jan. 2001, pp. 22-25, XP009053625.

* cited by examiner

*Primary Examiner* — Tien Dinh
*Assistant Examiner* — Philip J Bonzell
(74) *Attorney, Agent, or Firm* — Dickinson Wright PLLC (57) ABSTRACT

An aircraft with reduced environmental impact includes a turboprop, having two contra-rotating propellers, disposed on the rear portion on the back of the aircraft's fuselage so that the interaction noise of the propellers is masked, in the forward direction, by the wings and, in the rearward direction, by the aircraft's horizontal stabilizer.

16 Claims, 6 Drawing Sheets

METHOD FOR PRODUCING AN AIRCRAFT WITH REDUCED ENVIRONMENTAL IMPACT AND THE AIRCRAFT THUS OBTAINED

FIELD OF THE INVENTION

The present invention relates to a method for producing an aircraft with reduced environmental impact and the aircraft obtained by applying this method.

BACKGROUND OF THE RELATED ART

It is known that turboprops, with one or more propellers, have better energy efficiencies than turboshaft engines.

However, most of the existing aircraft are propelled by turboshaft engines which, on the one hand, have a high fuel consumption and, on the other hand, are sources of environmental pollution via their emissions into the atmosphere.

Therefore, with respect to energy-saving and environmental pollution, it would be more advantageous to furnish aircraft with turboprops rather than with turboshaft engines.

However, in operation, turboprops are still noisier than turboshaft engines, so that the advantage in energy-saving and environmental pollution through emissions, from which benefit would be derived by replacing turboshaft engines with turboprops, would be accompanied by the disadvantage of increased noise pollution. The noise pollution thus achieved would be unacceptable and, in any case, difficult to make compatible with the regulations that are currently in force.

It is also known that, amongst the known turboprops, those comprising two contrarotating propellers (usually called "contrarotating prop fans") are particularly attractive with respect to propulsive efficiency, on the one hand, and radial space requirement, on the other hand. Specifically, a turboprop with two contrarotating propellers has, for equal power, a propeller diameter that is at least 25% less than that of a single-propeller turboprop.

Such turboprops may advantageously be placed at the rear of the aircraft, so that the propellers are moved away from the cabin and the noise felt in the latter is reduced. It will be noted that such a rear installation of such a turboprop is favored, since the diameter of said propellers is reduced.

Furthermore, for example through GB-1 397 068, it is known how to use portions of the airframe of an aircraft in order to mask, downward, the noise generated by at least one turboshaft engine mounted at the rear of the aircraft, on the back of the latter.

SUMMARY OF THE INVENTION

The object of the present invention is to produce an aircraft with reduced environmental impact comprising at least one turboprop with two contrarotating propellers, mounted at the rear of said aircraft, on the back of the latter, applying the principle of masking noise with portions of the airframe of said aircraft so that the noise felt beneath said aircraft, particularly during take-offs and landings, is at least partially masked.

For this purpose, according to the invention, the method for producing an aircraft with reduced environmental impact, having a longitudinal axis and comprising a fuselage provided with two symmetrical wings and a rear horizontal stabilizer;

at least one turboprop with two contrarotating propellers mounted at the rear of the aircraft, on the back of the latter, the axis of said turboprop being at least substantially parallel to said longitudinal axis of said aircraft, is noteworthy in that:

a determination is made of the interaction noise of said contrarotating propellers that comprises:

a first conical lobe, directed toward the front of said turboprop and centered on the axis of the latter, the peak of said first conical lobe being at least approximately midway between the planes of said propellers, said first conical lobe being defined between a first external conical surface with a peak angle lying between 50° and 70° and a first internal conical surface with a peak angle lying between 20° and 40°, said first external and internal conical surfaces being coaxial with said turboprop and having their peaks indistinguishable from that of said first conical lobe; and a second conical lobe, directed toward the rear of said turboprop and centered on the axis of the latter, the peak of said second conical lobe being at least approximately midway between the planes of said propellers, said second conical lobe being defined between a second external conical surface with a peak angle lying between 40° and 60° and a second internal conical surface with a peak angle lying between 10° and 30°, said second external and internal conical surfaces being coaxial with said turboprop and having their peaks indistinguishable from that of said second conical lobe; and said turboprop is placed on the back of said aircraft, between said wings and said horizontal stabilizer, so that the bottom portion of said first conical lobe at least partially encounters said wings and that the bottom portion of said second conical lobe at least partially encounters said horizontal stabilizer.

Specifically, by studying turboprops with two contrarotating propellers, the applicant has noted that the noises generated by the turbine were negligible compared with propeller noises and that, amongst the latter, the noise specific to each propeller could be reduced so that the dominant noise generated by such turboprops was that resulting from the interaction of the propellers, each propeller causing lift fluctuations on the blades of the other propeller. In addition, the applicant was able to determine, both by experiment (recording the noise with microphones, particularly in an anechoic chamber) and by digital simulation based on the dynamics of the fluids, that this dominant noise, due to the interaction of the propellers, consisted of said front lobe and said rear lobe defined above.

Therefore, thanks to the present invention, the dominant noise of the turboprop may be masked downward and forward by the wings and downward and rearward by the horizontal stabilizer of the aircraft, which is of particular value during take-offs or landings.

The ranges of angular values given above for said first and second conical surfaces relate to different contrarotating turboprops and, for a particular contrarotating turboprop, it is appropriate to choose, in each range, the angular value appropriate to the latter.

Naturally, the present invention also relates to an aircraft obtained by applying the method described above.

In such an aircraft complying with the present invention, in order to allow a satisfactory masking of the propeller interaction noise corresponding to said front lobe, it is advantageous that said wings have a reverse sweep—that is to say that their free ends are further forward than their wing root sections—which makes it possible, while retaining a satisfactory quality of flight (particularly with respect to the position of the aerodynamic center relative to the center of gravity of the aircraft), to move said wing root sections sufficiently rearward for said wings, and the portion of fuselage placed between them, to be able to mask the forward noise. In addition, this reverse sweep makes it possible to limit, if not eliminate, the portions of the wings (in particular the sensitive elements such as the flaps or the fuel tanks) exposed to the risks of destruction by debris originating from the possible breakup of the turboprop. The angle of reverse sweep may be of the order of around twenty degrees.

It is advantageous that the turboprop(s) with two contrarotating propellers be of the "pusher" type, that is to say that it (they) is (are) arranged so that their propellers are at the rear and apply a thrust to the aircraft.

In the aircraft according to the present invention, the two contrarotating propellers are advantageously in front of the horizontal stabilizer, so that, in the case of an uncontained breakage of a portion of the turbine and/or breakage of a portion of the propellers, debris from the latter cannot damage or destroy the horizontal stabilizer, the stabilizer strut supporting the latter, or even the vertical stabilizer(s). The aircraft according to the invention therefore is not very sensitive to a possible breakup of the turboprop, all the more so since, level with said contrarotating propellers, the fuselage can be easily reinforced.

Naturally, in the aircraft of the present invention, the turboprop or each turboprop is mounted on the back of the aircraft by means of a support system, for example of the pylon or similar type. Preferably, such a support system is also placed in front of said stabilizer strut.

Therefore, said stabilizer strut is totally independent of said attachment system, so that said horizontal stabilizer may be of the type that can be trimmed in inclination, usually called THS (Trimmable Horizontal Stabilizer).

It will be noted that the noise generated when the slipstream of said support system is intercepted by said contrarotating propellers is masked downward by the portion of the fuselage that is beneath said pylon.

Where necessary, in order to compensate for the impact of moving the wings rearward due to their reverse sweep on the longitudinal stability of the aircraft, a movable airfoil of the canard type, at the front of the latter, can be provided. Such a canard surface also makes it possible to compensate for the reduction of the lever arm of the horizontal stabilizer relative to the center of the airfoil which otherwise could require an excessive increase in the surface area of said horizontal stabilizer. In addition, it helps in the rotation of the aircraft on take-off.

Furthermore, in order to limit the fuel consumption of the turboprop as much as possible, it is preferable that said contrarotating propellers of the latter comprise no peripheral shroud.

The aircraft according to the present invention may be single-engined and comprise only one turboprop with two contrarotating propellers mounted at the rear in the manner described hereinabove. However, in addition to this single turboprop, it may also comprise at least two turboshaft engines supported symmetrically by the wings of said aircraft. Such an arrangement is advantageous in the sense that the turboprop, consuming little fuel and not being very noisy due to the anti-noise mask according to the invention, makes it possible to reduce the power (and hence the noise and fuel consumption) of the turboshaft engines.

However, in a preferred embodiment of the aircraft according to the present invention, two turboprops are provided placed one beside the other with their axes parallel. In this case, the support system of said turboprops may comprise two individual pylons, respectively associated with the two turboprops and, where necessary, connected to one another by at least one transverse strut, or else consisting of a common structure, for example with a T-section or II-section, supporting the two turboprops.

Because of the rearward position of the wings of the aircraft according to the present invention, it is advantageous that the landing gear is beneath the fuselage in front of said wings. However, as a variant, said wings may comprise, in the vicinity of the fuselage, a forward-angled airfoil element in the concave leading edge of said wings, in order to allow the landing gear to be installed beneath the wings.

BRIEF DESCRIPTION OF THE DRAWINGS

The figures of the appended drawing will clearly explain how the invention may be embodied. In these figures, identical reference numbers indicate similar elements.

DETAILED DESCRIPTION OF THE INVENTION

Figure 1:
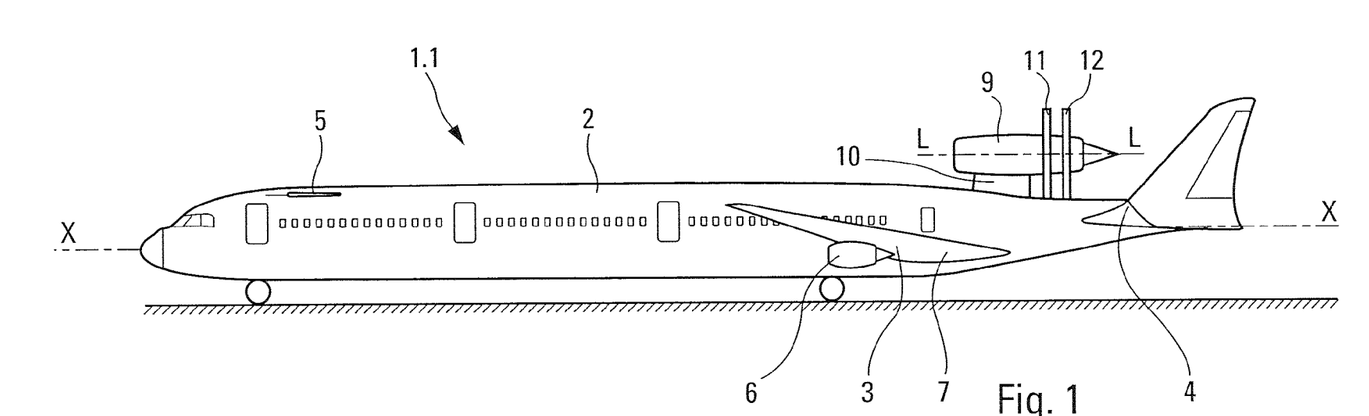
FIGS. 1, 2 and 3 show schematically, respectively in side view, in front view and in top view, a first embodiment of an aircraft according to the present invention.
Figure 2:
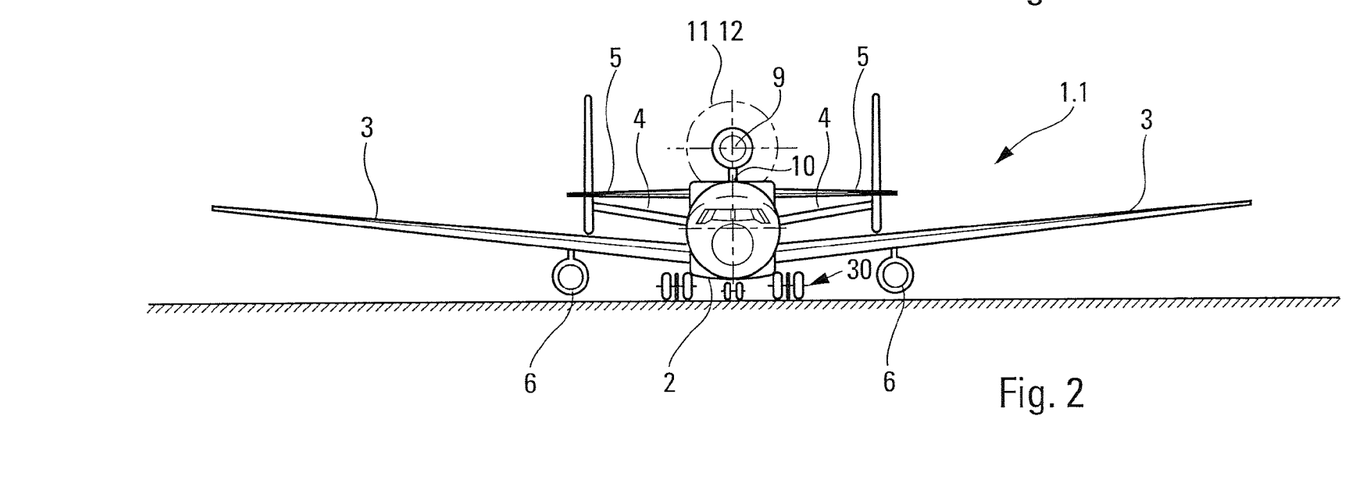
Figure 3:
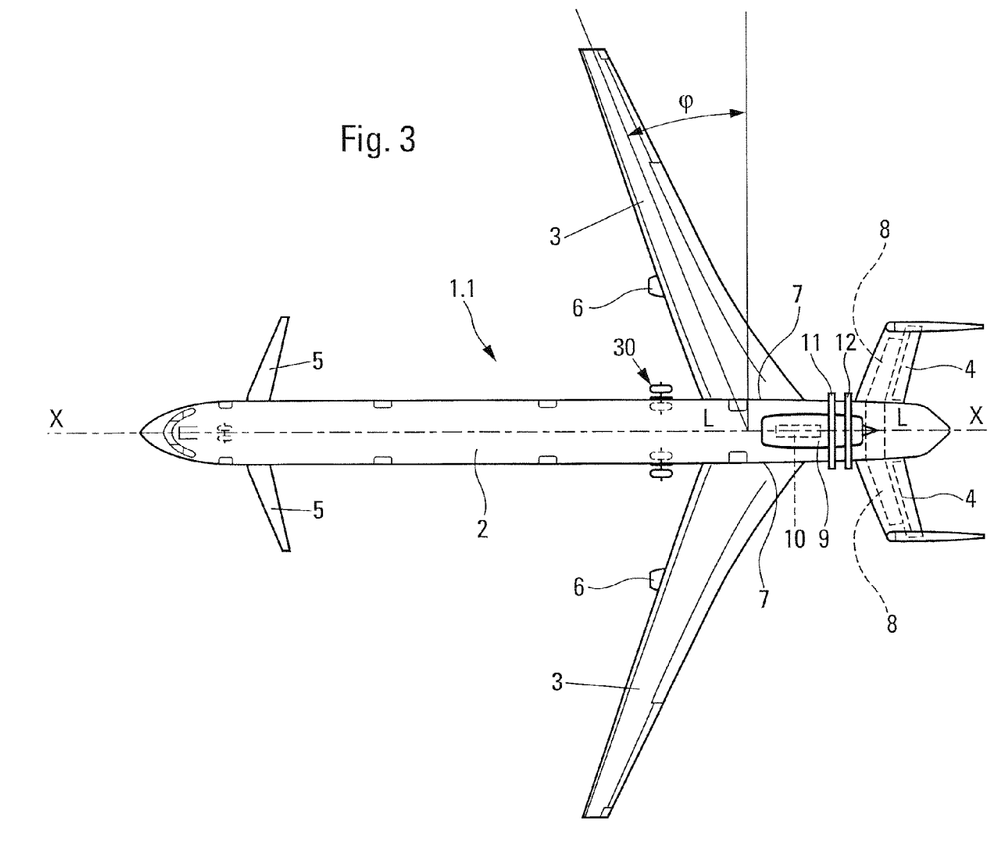

The commercial aircraft 1.1, according to the invention and shown schematically in FIGS. 1 to 3, has a longitudinal axis X-X and comprises a fuselage 2, provided with two symmetrical wings 3, a rear horizontal stabilizer 4 and a front airfoil 5 of the canard type.

The wings 3, which each support a turboshaft engine 6, have a reverse sweep Φ, for example of the order of around twenty degrees, and their wing root sections 7 are moved backward toward said horizontal stabilizer 4.

The horizontal stabilizer 4 is of the known THS type with variable inclination and is supported by a stabilizer strut 8.

On the back of the rear portion of its fuselage, the aircraft 1.1 supports a turboprop 9, supported by a vertically protruding pylon 10 fixedly attached to the structure of said aircraft. The turboprop 9 has an axis L-L parallel with the longitudinal axis X-X (the axes L-L and X-X define the vertical horizontal mid-plane of the aircraft 1.1) and comprises two unshrouded contrarotating propellers 11 and 12 (represented in simplified fashion in FIGS. 1 to 3 and 5, but in greater detail in FIG. 4).

The contrarotating propellers 11 and 12 are placed at the rear of the turboprop 9 and are capable of applying a thrust to said aircraft 1.1.

Figure 4:
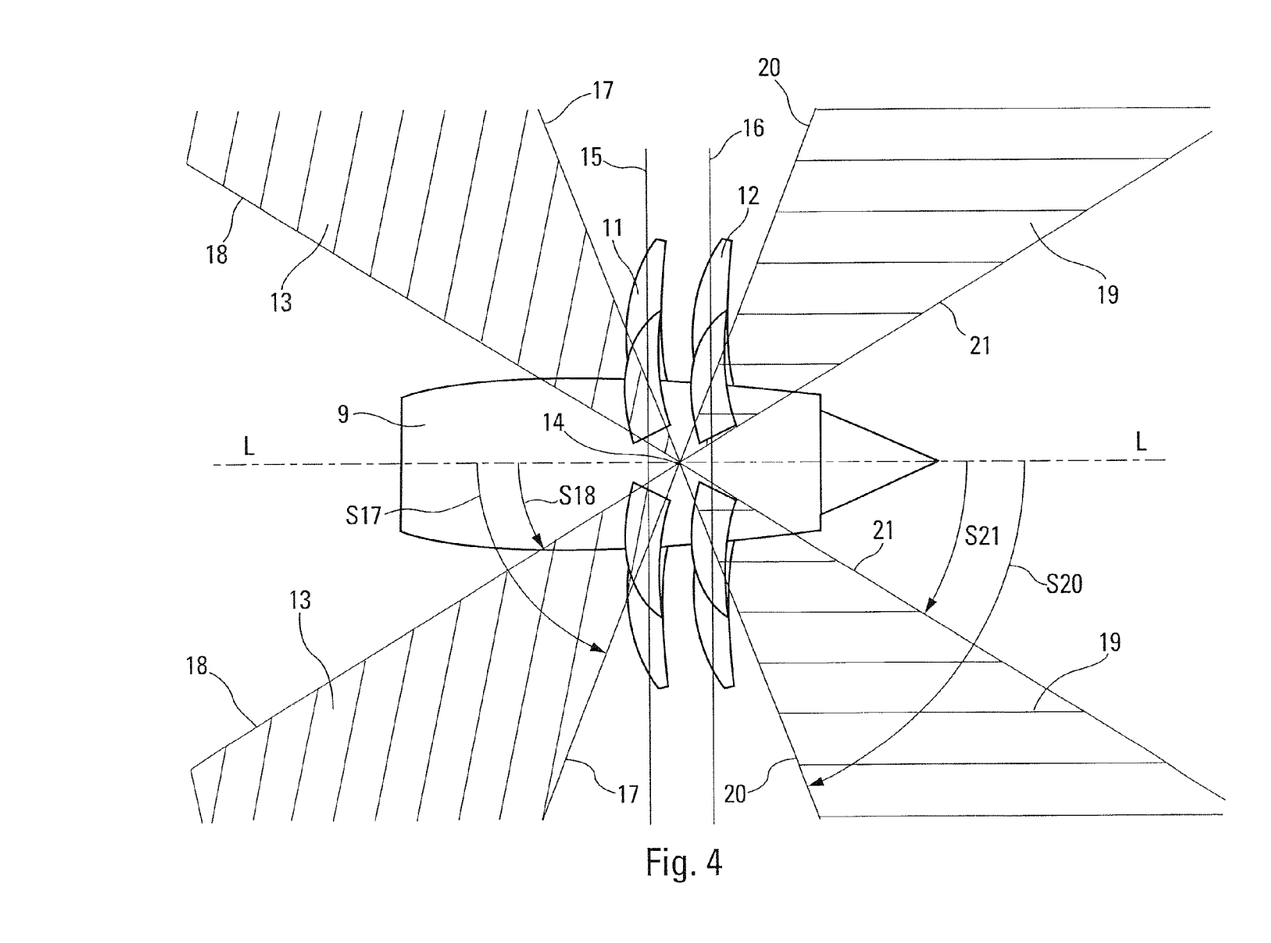
FIG. 4 illustrates schematically the propeller interaction noise generated by the turboprop fitted to the aircraft of FIGS. 1 to 3.

To apply the present invention, the first thing to do is to determine, by experimental measurements and/or digital simulation, the interaction noise of the contrarotating propellers 11 and 12, as is illustrated by FIG. 4. This interaction noise comprises:

a conical lobe 13, directed toward the front of the turboprop 9 and centered on the axis L-L of the latter, the peak 14 of the lobe 13 being on said axis L-L in the middle of the planes 15 and 16 of the propellers 11 and 12. The front conical lobe 13 is defined between an external conical surface 17 with an axis L-L, a peak 14 and a peak angle S17 lying between 50° and 70° (depending on the particular type of turboprop 9) and an internal conical surface 18 with an axis L-L, a peak 14 and a peak angle S18 lying between 20° and 40° (depending on the particular type of turboprop 9); and a conical lobe 19, directed toward the rear of the turboprop 9 and centered on the axis L-L of the latter, the peak of the lobe 19 being indistinguishable from the peak 14. The rear conical lobe 19 is defined between an external conical surface 20 with an axis L-L, a peak 14 and a peak angle S20 lying between 40° and 60° (depending on the particular type of turboprop 9) and an internal conical surface 21 with an axis L-L, a peak 14 and a peak angle S21 lying between 10° and 30° (depending on the particular type of turboprop 9).

Figure 5:
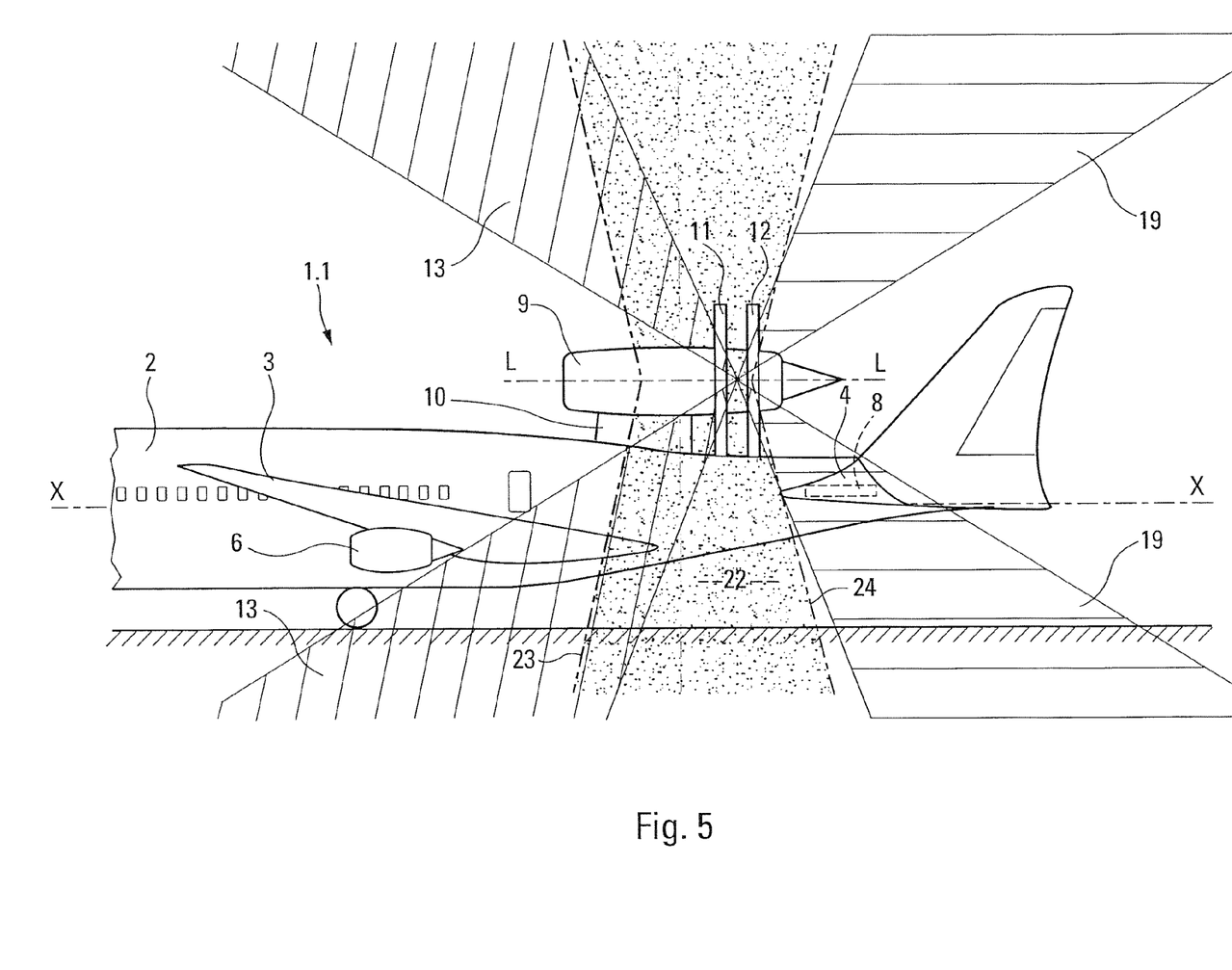
FIG. 5 illustrates, on a larger scale, the installation of said turboprop on the aircraft of FIGS. 1 to 3.

After the front lobe 13 and the rear lobe 19 have been determined, the longitudinal position of the turboprop 9 on the aircraft is determined to be between the wings 3 and the horizontal stabilizer 4, so that the noise of the lobe 13 is masked downward by the wings 3 and the portion of the fuselage 2 being between them and so that the noise of the lobe 19 is masked downward by the horizontal stabilizer 4 and, where necessary, by the portion of fuselage 2 supporting it (see FIG. 5).

Therefore, in such an arrangement, the pylon 10 and the propellers 11, 12 are placed in front of the horizontal stabilizer 4 and its supporting strut 8.

Furthermore, if, in operation, the turboprop 9 should break up, its debris and/or that of the propellers 11 and 12 would follow trajectories lying in a breakup zone 22, centered on the axis L-L of said turboprop and delimited, transversely to said axis, by a front edge 23 and by a rear edge 24 (see FIG. 5).

It will be easily understood that, thanks to the arrangement of the turboprop 9 on the aircraft 1.1 according to the present invention, it is possible to arrange that the wings 3 and the horizontal stabilizer 4 are outside the breakup zone 22. Therefore, in the event of a breakup of the turboprop 9 and/or of the propellers 11, 12, the wings 3, the stabilizer 4 and the stabilizer strut 8 could not be damaged.

The commercial aircraft 1.2 shown in FIGS. 6 and 7 comprises the same elements 2 to 5, 7 and 8 as those described with reference to FIGS. 1 to 3 for the aircraft 1.1. On the other hand, its wings 3 do not support turboshaft engines 6 and the rear portion of its fuselage supports, on the back of the latter, two turboprops 9G and 9D placed one beside the other with their axes parallel. Each of the turboprops 9G and 9D is identical to the turboprop 9 described above and comprises contrarotating propellers 11, 12 like the latter. Also, each turboprop 9G, 9D has a front lobe 13 and a rear lobe 19 representative of the interaction noise of the propellers 11, 12 and a breakup zone 22.

In a manner similar to what has been described above for the aircraft 1.1, each of the engines 9G and 9D in the aircraft 1.2 is placed so that its noise lobes 13 and 19 are masked by the wings 3 and the horizontal stabilizer 4 and the adjacent portions of fuselage, respectively, and so that its breakup zone 22 passes between said wings 3 and said horizontal stabilizer 4.

Figure 6:
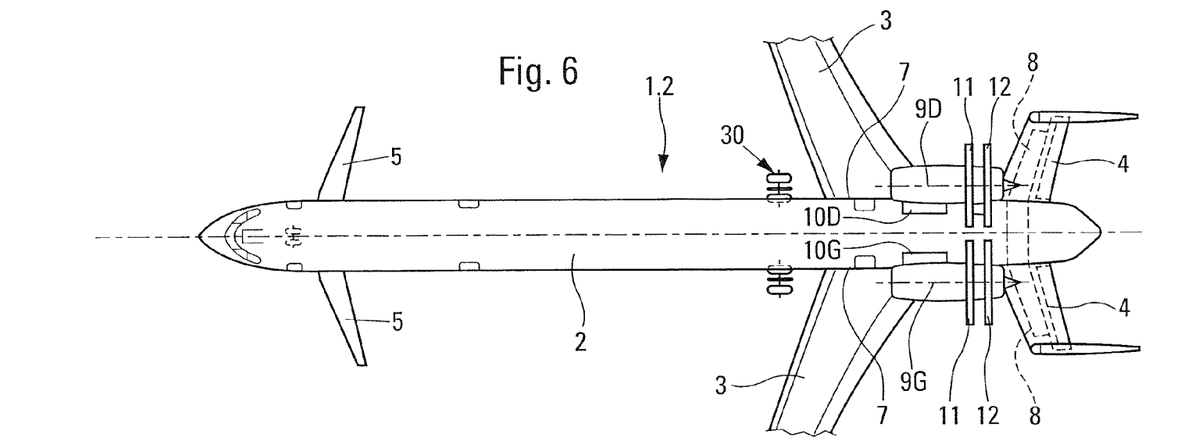
FIGS. 6 and 7 show schematically, respectively in top view (truncated) and in front view, a second embodiment of the aircraft according to the present invention.
Figure 7:
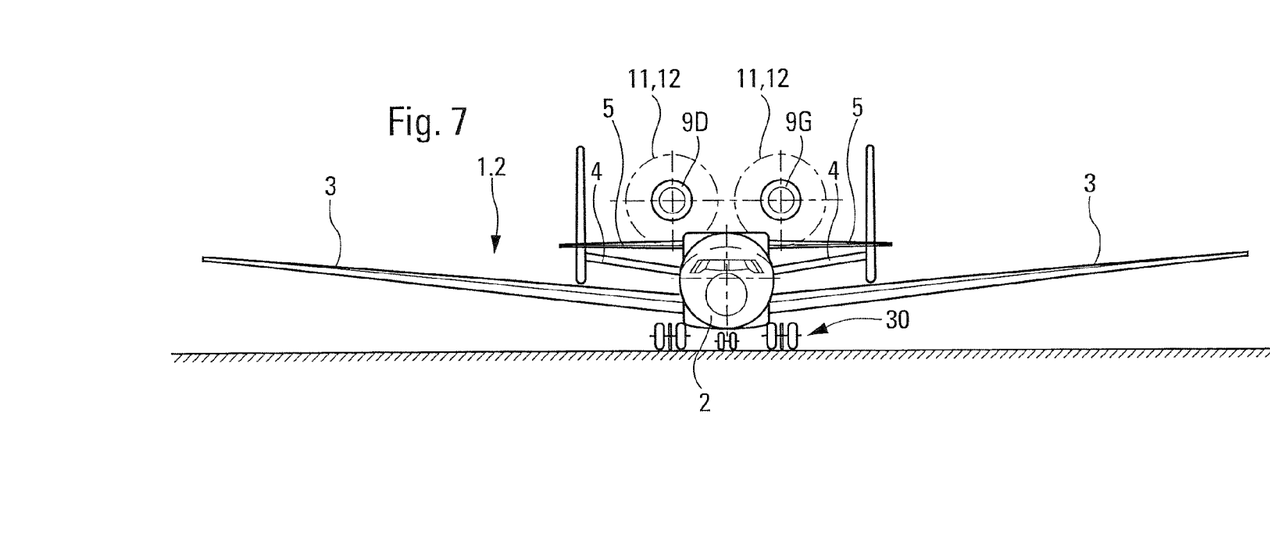
Figure 8A:
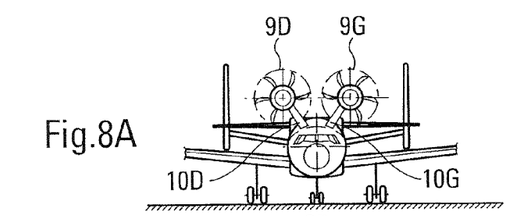
FIGS. 8A to 8E illustrate schematically variants of support systems for the turboprops of the aircraft of FIGS. 6 and 7.
Figure 8B:
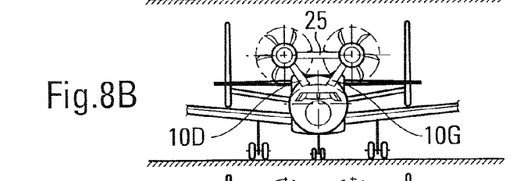
Figure 8C:
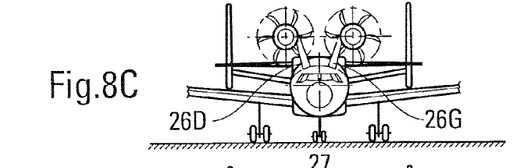
Figure 8D:
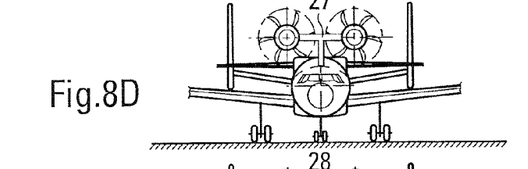
Figure 8E:
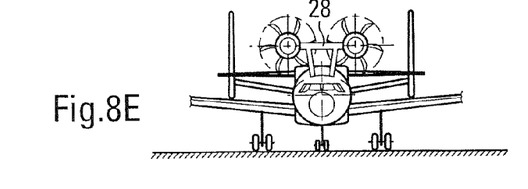

FIG. 6 and FIG. 8A show a support system for the turboprops 9G and 9D comprising two individual radial pylons 10G and 10D, similar to the pylon 10 of the turboprop 9. As FIG. 8B shows, the assembly of the radial pylons 10G and 10D may be reinforced by a transverse strut 25. Instead of being radial, the individual supporting pylons of the turboprops 9G and 9D may be tangential (see the pylons 26G and 26D of FIG. 8C). Said support system for the turboprops 9G and 9D may also be common to the latter and, for example, may have a T-section (see 27 in FIG. 8) or an Π-section (see 28 in FIG. 8E).

The choice of support system type depends both on the noise constraints (interaction of the propeller 11 with the slipstream of said support system) and on structural constraints, and also on constraints associated with the certification of the aircraft.

Figure 9:
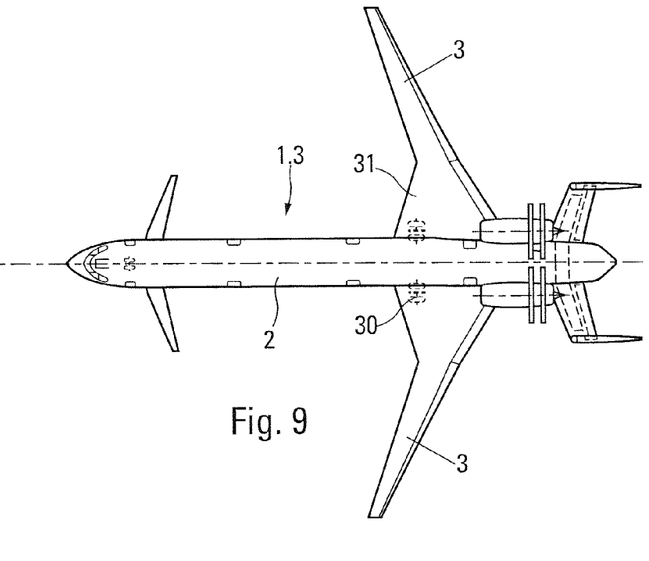
FIG. 9 shows schematically, in top view, a variant of the aircraft of FIGS. 6 and 7.

Preferably, the landing gear 30 of the aircraft 1.1 or 1.2 according to the present invention is placed on the fuselage 2 in front of the wings 3. However, if necessary, it is possible to provide, in the vicinity of the fuselage 2, a forward-angled airfoil element 31 in the concave leading edge of the wings 3 in order to be able to install the landing gear 30 beneath the airfoil formed by said wings (see the aircraft 1.3 of FIG. 9).

The invention claimed is:

1. An aircraft with reduced environmental impact, the aircraft comprising:
    a fuselage provided with two symmetrical wings and a rear horizontal stabilizer;
    a turboprop with two contra-rotating propellers mounted at the rear of the aircraft, the axis of said turboprop substantially parallel to the longitudinal axis of said aircraft, wherein:
    a first conical lobe, defining amplitude with respect to spatial position, of interaction noise from said contra-rotating propellers is directed toward the front of said turboprop and centered on the axis of the turboprop, the vertex of said first conical lobe is approximately midway between geometric planes of said propellers, said first conical lobe disposed between a first external conical surface having an angle of 50° to 70° from the axis of said turboprop and a first internal conical surface having an angle of 20° to 40° from the axis of said turboprop, said first external and internal conical surfaces being coaxial with said turboprop and having the same vertices as that of said first conical lobe; and
    a second conical lobe, defining amplitude with respect to spatial position, of the interaction noise from said contra-rotating propellers is directed toward the rear of said turboprop and centered on the axis of the turboprop, the vertex of said second conical lobe is approximately midway between the geometric planes of said propellers, said second conical lobe disposed between a second external conical surface having an angle of 40° to 60° from the axis of said turboprop and a second internal conical surface having an angle of 10° to 30° from the axis of said turboprop, said second external and internal conical surfaces being coaxial with said turboprop and having the same vertices as that of said second conical lobe; and
    said turboprop is disposed on the back of said aircraft, between said wings and said horizontal stabilizer, so that the bottom portion of said first conical lobe encounters said wings and the bottom portion of said second conical lobe encounters said horizontal stabilizer.

2. The aircraft as claimed in claim 1, wherein said wings have a reverse sweep.

3. The aircraft as claimed in claim 2, wherein the angle of reverse sweep of said wings is equal to around twenty degrees.

4. The aircraft as claimed in claim 2, wherein said contra-rotating propellers are placed at the rear of said turboprop and are capable of applying a thrust to said aircraft.

5. The aircraft as claimed in claim 2, which further comprises, at the front, a movable airfoil of a canard type.

6. The aircraft as claimed in claim 2, wherein said contra-rotating propellers comprise no peripheral shroud.

7. The aircraft as claimed in claim 2, which further comprises two turboshaft engines supported symmetrically by the wings of said aircraft.

8. The aircraft as claimed in claim 2, wherein landing gear is disposed beneath the fuselage.

9. The aircraft as claimed in claim 2, wherein, in the vicinity of the fuselage, said wings each comprise a forward-angled element of the wing's concave leading edge and wherein landing gear is disposed beneath said forward-angled element.

10. The aircraft as claimed in claim 2, wherein:
    said turboprop is mounted on the back of said aircraft by means of a support system, of the pylon or similar type, and
    said support system is placed in front of a strut assembly supporting said horizontal stabilizer.

11. The aircraft as claimed in claim 10, wherein said horizontal stabilizer can be trimmed in inclination.

12. The aircraft as claimed in claim 2, which further comprises:
    another turboprop having two contra-rotating propellers, wherein
    the two turboprops are mounted beside each other with their axes parallel.

13. The aircraft as claimed in claim 12, wherein a support system of the two turboprops comprises a structure common to these two turboprops.

14. The aircraft as claimed in claim 12, wherein a support system of the two turboprops comprises two individual pylons, respectively associated with the turboprops.

15. The aircraft as claimed in claim 14, wherein the two individual pylons are connected to one another by at least one transverse strut.

16. A method for producing an aircraft with reduced environmental impact, the aircraft comprising a fuselage provided with two symmetrical wings and a rear horizontal stabilizer; a turboprop with two contra-rotating propellers mounted at the rear of the aircraft, the axis of said turboprop substantially parallel to the longitudinal axis of said aircraft, the method comprising:
    determining a first conical lobe, defining amplitude with respect to spatial position, of interaction noise from said contra-rotating propellers that is directed toward the front of said turboprop and centered on the axis of the turboprop, wherein the first conical lobe is determined such that:
        the vertex of said first conical lobe is approximately midway between geometric planes of said propellers,
        said first conical lobe is disposed between a first external conical surface having an angle of 50° to 70° from the axis of said turboprop and a first internal conical surface having an angle of 20° to 40° from the axis of said turboprop, and
        said first external and internal conical surfaces are coaxial with said turboprop and have the same vertices as that of said first conical lobe;
    determining a second conical lobe, defining amplitude with respect to spatial position, of the interaction noise from said contra-rotating propellers that is directed toward the rear of said turboprop and centered on the axis of the turboprop, wherein the second conical lobe is determined such that:
        the vertex of said second conical lobe is approximately midway between the geometric planes of said propellers,
        said second conical lobe is disposed between a second external conical surface having an angle of 40° to 60° from the axis of said turboprop and a second internal conical surface having an angle of 10° to 30° from the axis of said turboprop, and
        said second external and internal conical surfaces are coaxial with said turboprop and have the same vertices as that of said second conical lobe; and
    placing said turboprop on the back of said aircraft, between said wings and said horizontal stabilizer, so that the bottom portion of said first conical lobe encounters said wings and the bottom portion of said second conical lobe encounters said horizontal stabilizer.

\* \* \* \* \*